US012700777B2

(12) United States Patent
Dong et al.

(10) Patent No.: US 12,700,777 B2
(45) Date of Patent: Aug. 4, 2026

(54) BRUSHLESS DIRECT CURRENT MOTOR AND HAIR DRYER USING THE SAME

(71) Applicant: SHENZHEN INTELTRON INTELLIGENT SCIENCE & TECHNOLOGY CO., LTD., Shenzhen (CN)

(72) Inventors: Xiaoyong Dong, Shenzhen (CN); Dongqing Huang, Shenzhen (CN); Chunhui Li, Shenzhen (CN); Bo Tang, Shenzhen (CN); Zhixin Zhang, Shenzhen (CN)

(73) Assignee: SHENZHEN INTELTRON INTELLIGENT SCIENCE & TECHNOLOGY CO., LTD., Shenzhen (CN)

( * ) Notice: Subject to any disclaimer, the term of this patent is extended or adjusted under 35 U.S.C. 154(b) by 840 days.

(21) Appl. No.: 18/097,560

(22) Filed: Jan. 17, 2023

(65) Prior Publication Data

US 2023/0344319 A1    Oct. 26, 2023

Related U.S. Application Data

(63) Continuation of application No. PCT/CN2022/134427, filed on Nov. 25, 2022.

(30) Foreign Application Priority Data

Apr. 25, 2022    (CN) .......................... 202210442281.0

(51) Int. Cl.
*H02K 11/35* (2016.01)
*A45D 20/12* (2006.01)
*H02K 11/33* (2016.01)

(52) U.S. Cl.
CPC ............. *H02K 11/33* (2016.01); *A45D 20/12* (2013.01); *H02K 2211/03* (2013.01)

(58) Field of Classification Search
CPC ..... A45D 20/12; H02K 11/33; H02K 2211/03
(Continued)

(56) References Cited

U.S. PATENT DOCUMENTS

2006/0196075 A1*  9/2006  Santhouse .............. A45D 20/10
                                                        34/96
2010/0117468 A1*  5/2010  Kurita ................. F04D 25/0633
                                                        310/68 B
(Continued)

FOREIGN PATENT DOCUMENTS

CN        102149515 A      8/2011
CN        105795673 A      7/2016
(Continued)

OTHER PUBLICATIONS

International Search Report of Corresponding Application PCT/CN2022/134427, mailed Feb. 9, 2023, 5 pages.
(Continued)

*Primary Examiner* — Connor J Tremarche
(74) *Attorney, Agent, or Firm* — Cooper Legal Group, LLC

(57) ABSTRACT

The present application relates to a field of motor, in particular, relates to a brushless direct current motor and a hair dryer using the same, which includes a main body and a driver. The driver includes a driving board configured for integrating driving components, a control board configured for integrating control components and a wiring board configured for wiring. The driving board is provided at a side of the wiring board away from the stator end of the main body. A plane where the driving board is located is parallel to an extending direction of the stator end of the main body
(Continued)

towards the wiring board. The driving board is configured to be electrically connected with the wiring board and the control board respectively. The present application has an effect of improving a heat dissipation efficiency of the driving components of the motor in the hair dryer.

5 Claims, 6 Drawing Sheets

(58) Field of Classification Search
USPC ............................................................ 34/97
See application file for complete search history.

(56) References Cited

U.S. PATENT DOCUMENTS

2011/0250047 A1* 10/2011 June ...................... F04D 29/462
415/36

| 2016/0213122 A1* | 7/2016 | Sakuma ................. A45D 20/12 |
|---|---|---|
| 2018/0075776 A1* | 3/2018 | Heitmann ............ A45D 44/005 |
| 2019/0142132 A1* | 5/2019 | Nelson ................ H01M 50/247 |
| | | 34/96 |

FOREIGN PATENT DOCUMENTS

| CN | 206611063 | U | 11/2017 |
|---|---|---|---|
| CN | 110150827 | A | 8/2019 |
| CN | 209375318 | U | 9/2019 |
| CN | 209547305 | U | 10/2019 |
| CN | 111820569 | A | 10/2020 |
| CN | 112716127 | A | 4/2021 |
| CN | 214205209 | U | 9/2021 |
| CN | 114977673 | A | 8/2022 |

OTHER PUBLICATIONS

First Office Action received in corresponding Chinese patent application No. 202210442281.0, dated Feb. 21, 2025, 10 pages.

* cited by examiner

BRUSHLESS DIRECT CURRENT MOTOR AND HAIR DRYER USING THE SAME

CROSS-REFERENCE TO RELATED APPLICATION

The present application is a continuation of PCT application No. PCT/CN2022/134427, filed on Nov. 25, 2022, which claims the priority to Chinese patent application No. 202210442281.0, filed on Apr. 25, 2022. The entireties of PCT application No. PCT/CN2022/134427 and Chinese patent application No. 202210442281.0 are hereby incorporated by reference herein and made a part of this specification.

TECHNICAL FIELD

The present application relates to a field of motor, and, in particular, relates to a brushless direct current (DC) motor and a hair dryer using the same.

BACKGROUND ART

A brushless DC motor consists of a motor body and driver, and is a typical mechatronic product. Applications of the brushless DC motor in our life are also increasing, for example, in a hair dryer for our daily use.

When using the hair dryer, driving components at the motor will generate heat continuously. When the hair dryer blows out hot air, a temperature inside the hair dryer will increase, which may lead to a damage to the driving components. However, there is a low heat dissipation efficiency for the driving components of the motor inside the hair dryer, which needs to be further improved.

SUMMARY

In order to improve a heat dissipation efficiency of the driving components of the motor inside the hair dryer, the present application provides a brushless DC motor and a hair dryer using the same.

First, the present application provides the brushless DC motor, adopting the following technical solutions.

The brushless DC motor includes a main body and a driver, wherein, the driver includes a driving board configured for integrating driving components, a wiring board and a control board configured for integrally controlling components; the wiring board is provided at a stator end of the main body; the driving board is provided at a side of the wiring board away from the stator end of the main body; a plane where the driving board is located is parallel to an extending direction of the stator end of the main body towards the wiring board; the driving board is electrically connected with the wiring board and the control board respectively.

In the above technical solutions, during a practical use of the brushless motor provided in the present application, by integrating the driving components of the driver on the driving board, and integrating control components on the control board, on one hand, a driving circuit can be preset on the driving board, compared with conventional high speed brushless DC motor, there is no need to additionally provide the drive circuit to drive the motor, and it is more convenient for use by electrically connecting the control board; on the other hand, the driving components are detachably assembled, so that there is a low influence on the control components during the process of the driving components generating heat, and contact areas between all of the driving components and air are increased, so as to improve a heat dissipation efficiency of the driving components at the driving board. In addition, the plane where the driving board is located is parallel to an extending direction from the stator end of the main body towards the wiring board, thus the driving components provided at the driving board is in a wind blowing direction of the device, so that the device can be used to cool the brushless motor to improve the heat dissipation efficiency of the brushless motor.

In some embodiments, a side of the driving board towards the wiring board is provided with an extended mounting section, and the wiring board is provided with a bar shaped groove configured for an insertion of the extended mounting section.

In the above technical solutions, in order to assemble the driving board with the main body, the extended mounting section at the driving board is inserted into the bar shaped groove. On one hand, the driving board can be fixedly connected with the main body; on the other hand, it can help keep the plane where the driving board is located parallel to the extending direction from the stator end of the main body towards the wiring board.

In some embodiments, the extended mounting section is provided with a first conductive layer, and a second conductive layer is provided at a position at an inner wall of the bar shaped groove corresponding to the position of the first conductive layer; and the first conductive layer is configured to be electrically connected with the second conductive layer after the extended mounting section is inserted into the bar shaped groove.

In the above technical solutions, after the extended mounting section is inserted into the bar shaped groove, the first conductive layer abuts against the second conductive layer, so that an electric connection between the driving board and the wiring board can be realized.

In some embodiments, a surface of the driving board is provided with an interface terminal configured for connecting the driving board with an external circuit.

In the above technical solutions, during a whole assembly process of the brushless motor, by using the interface terminal welded at the driving board, a row of wires at the control board can be plugged into the interface terminal, so as to electrically connect the driving board with the control board.

Second, the present application provides the hair dryer, adopting the following technical solutions.

The hair dryer includes a housing and the brushless direct current motor, and the housing includes an inlet section, a heat generation section and an outlet section; the motor is provided between the heat generation section and the inlet section, and the driving board is located at a side of the motor towards the heat generation section; a fan assembly is provided at a side of the motor towards the inlet section; an inner wall of the housing is provided with a guiding assembly configured for guiding a wind in the housing to the driving board.

In the above technical solutions, during a use of the hair dryer, the electric fan assembly of the motor rotates in the housing. During a process of the wind blowing from the inlet section towards the outlet section, the driving components at the driving board is in a process of continuous generating heat. However, because the plane where the driving board is located is the consistent with a wind direction in the housing, the wind blowing from the fan assembly to the outlet section can pass through the driving components at the driving board, so as to improve the heat dissipation efficiency of the driving components at the driving board.

In some embodiments, the guiding assembly includes guide vanes obliquely provided at two inner walls of the housing opposite to each other, and the guide vanes are provided at the inner wall of the housing, which is parallel to a side surface of the driving board where the driving components are integrated.

In the above technical solutions, by providing the guide vane, when the wind in the housing blows to the guide vane, because the guide vanes is inclined, the wind blowing to the guide vanes can be guided to the middle of the housing, so as to change the wind direction and allow more wind to be guided to the driving board.

In some embodiments, a side of the guide vane away from the driving board is provided with multiple magnetic blocks, an electromagnet is provided at positions at the inner wall of the housing corresponding to positions of the magnetic blocks, and the inner wall of the housing is provided with a temperature sensor.

In the above technical solutions, when it is detected that the temperature in the housing rises and reaches to a preset threshold by using the temperature sensor, different electromagnets can be controlled to be powered on. After the electromagnet is powered on, the corresponding magnetic block at the guide vane can be attached, so as to change an inclination angle of the guide vane. The larger an included angle between the guide vane and the inner wall of the housing, the more the wind can be guided to the driving board. Thus, by providing multiple electromagnets and multiple magnetic blocks, when reaching different temperature thresholds, the inclination angle of the guide vane can be adjusted, so as to realize an adjustment of the amount of the wind blowing to the driving board.

In some embodiments, the guide vane is of an arc shape, and a side of the guide vane towards the driving board is concave.

In the above technical solutions, by providing the guide vane as the arc, when the wind blows to the guide vane, the wind can be guided to the driving board more smoothly.

In some embodiments, the guiding assembly includes an elastic layer provided at the inner wall of the housing, and an accommodation chamber is formed between the elastic layer and the inner wall of the housing, and filled with a vaporized liquid.

In the above technical solutions, the temperature in the housing rises, and the vaporized liquid in the accommodation chamber vaporizes slowly when heated, thus an atmospheric pressure in the accommodation chamber is greater than that in the housing, and then the elastic layer protrudes towards the driving board. When the wind in the housing blows towards the outlet section, because the wind is guided by the bulging elastic layer, the wind blows towards the driving board in the housing, so as to increase the amount of the wind blowing to the driving board.

In some embodiments, the elastic layer is of an arc shape protruding out of the inner wall of the housing; and an arc limit plate is provided at the inner wall of the housing along an outer side of the elastic layer and at both ends of elastic layer.

In the above technical solutions, when the vaporized liquid is vaporized when heated, the protruding direction of the elastic layer can be limited by the provided arc limit plate, thus the elastic layer protrudes more towards the driving board, so as to allow more wind to be guided to the driving board.

In summary, the present application has at least one of the following technical features: compared with conventional high speed brushless DC motor, there is no need to additionally provide the drive circuit to drive the motor, and it is more convenient for use by electrically connecting the control board; the contact areas between all of the driving components and air are increased, so as to improve the heat dissipation efficiency of the driving components at the driving board; the brushless motor can be cooled by using the device, so as to improve the heat dissipation efficiency of the brushless motor.

The wind blowing from the fan assembly towards the outlet section can pass through the driving components at the driving board, so as to improve the heat dissipation efficiency of the driving components at the driving board; the wind direction between the heat generation section and the motor in the housing can be adjusted by using the guiding assembly, so as to allow more wind to be guided to the driving components at the driving board, and ensure the heat dissipation efficiency of the driving components at the driving board.

DETAILED DESCRIPTION

The present application is further described in detail below.

Figure 1:
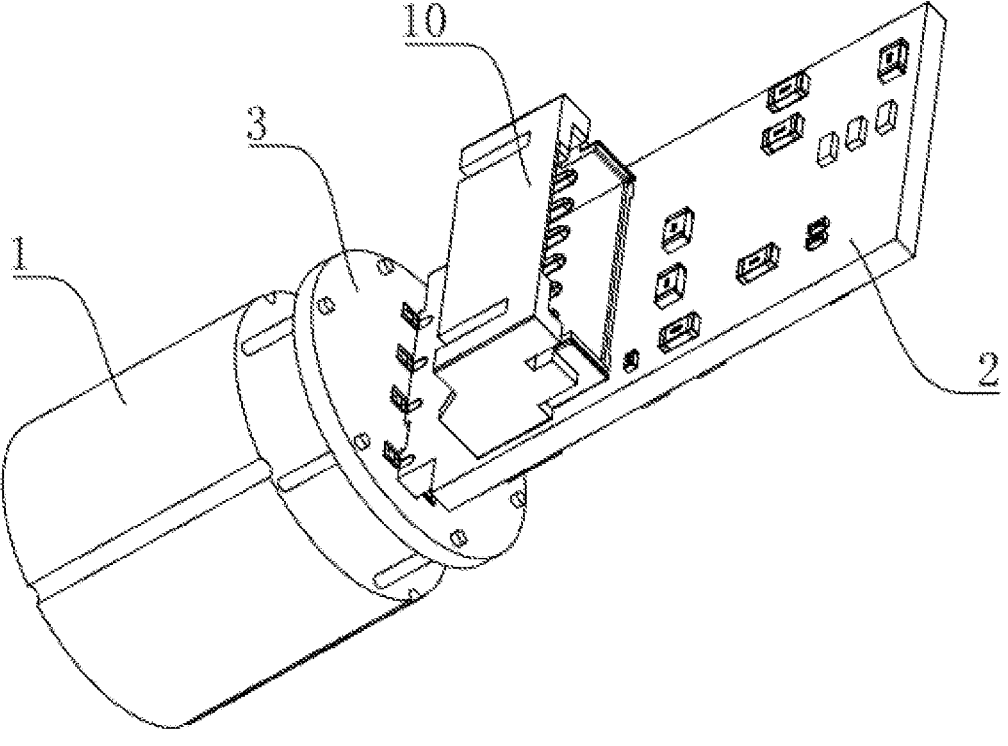
FIG. 1 is a diagram of the structure of a brushless DC motor in embodiments of the present application.
Figure 2:
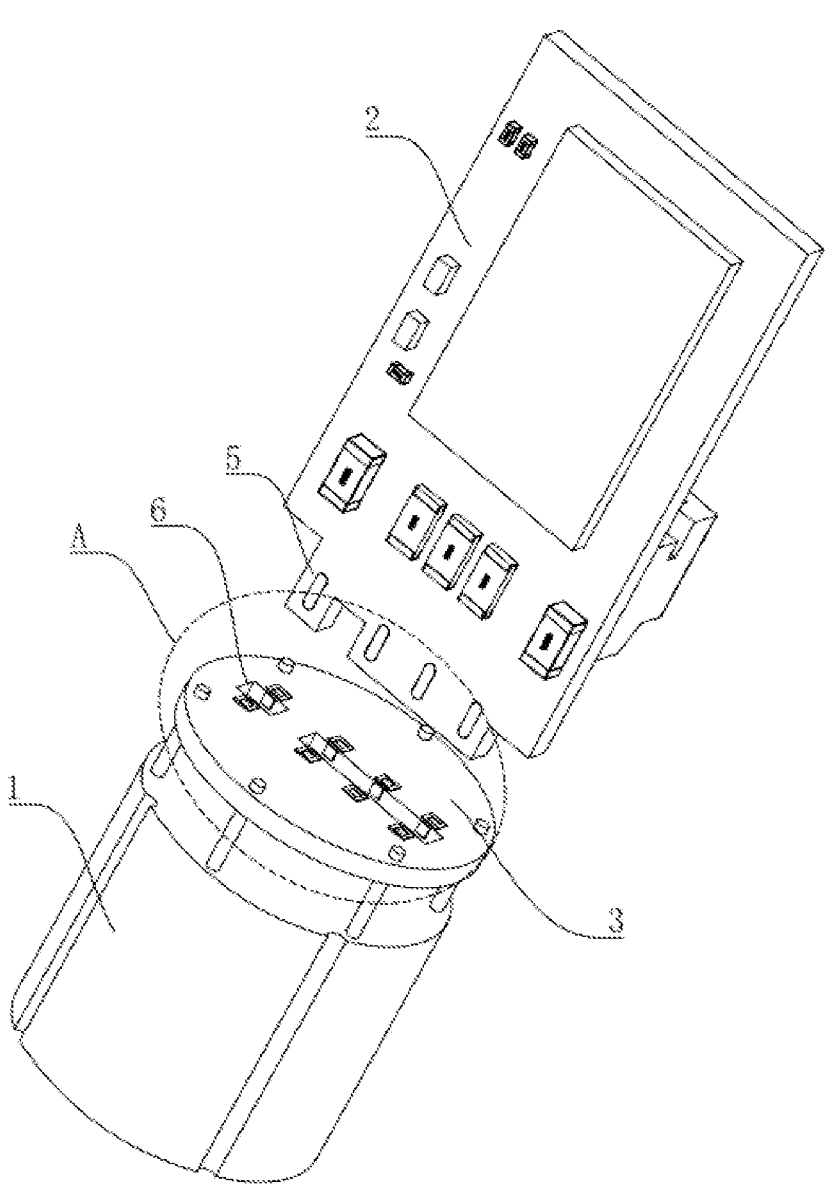
FIG. 2 is an exploded view of a wiring board and a driving board of the brushless DC motor in embodiments of the present application.

First, a brushless DC motor provided in the present application, referring to FIG. 1 and FIG. 2, includes a main body 1 and a driver. In an embodiments of the present application, the driver includes a driving board 2 configured for integrating driving components, a control board (not shown in figures) configured for integrating control components and a wiring board 3 configured for wiring. A driving circuit of the brushless motor can be preset on the driving board 2, and during a subsequent use of the motor, there is no need to additionally provide the driving circuit to drive the motor. The wiring board 3 is mounted at a stator end of the main body 1. For a conventional uniaxial motor, only one end is provided with an output shaft connected to a rotor.

In the present application, the stator end refers to an end of the uniaxial motor opposite to an end provided with the output shaft.

Figure 3:
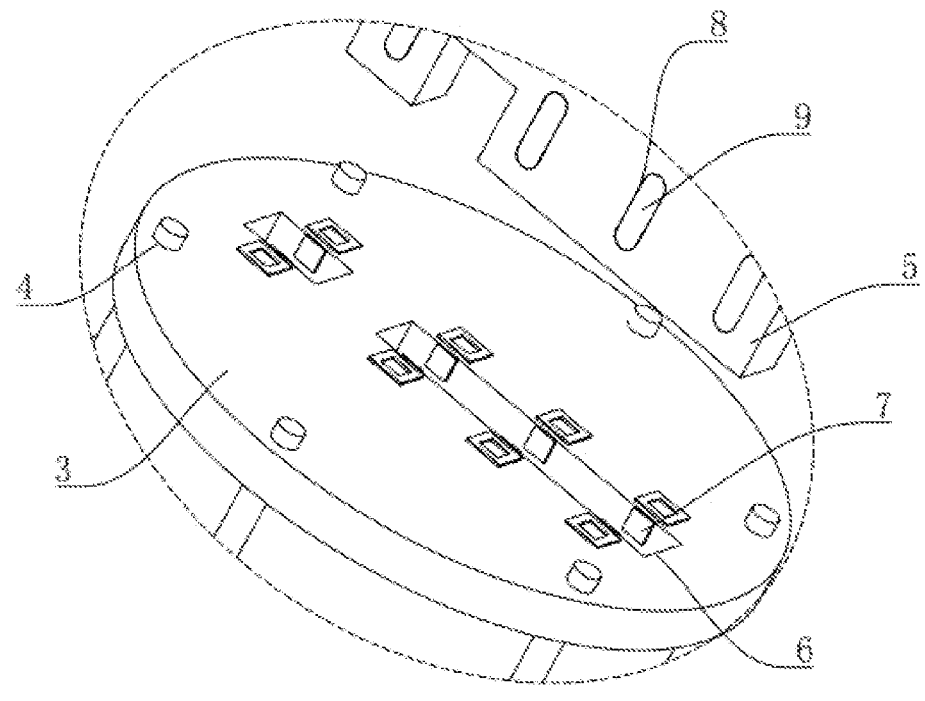
FIG. 3 is an enlarged view of part A in FIG. 2 of embodiments of the present application.

Referring to FIG. 2 and FIG. 3, in order to fix the wiring board 3, the wiring board 3 is provided with multiple through holes 4, penetrating trough the wiring board 3 and configured for welding a stator end winding of the main body 1. In the present application, the wiring board 3 is provided with six through holes 4, and the winding is welded at the wiring board 3 to fixedly connect the wiring board 3 with the stator. The driving board 2 is fixedly connected at a side of the wiring board 3 away from the stator end of the main body 1. The control board and the driving board 2 are detachably assembled, and the driving board 2 is electrically connected with the wiring board 3 and the control board respectively.

The driving components are integrated on the driving board 2, and the control components are integrated on the control board, and the driving board 2 and the control board are detachably assembled. Therefore, during a process of the driving components generating heat, there is a low effect on the control components, and contact areas between all of the driving components and air are increased, so as to improve a heat dissipation efficiency of the driving components at the driving board 2.

Additionally, referring to FIG. 2 and FIG. 3, when the brushless DC motor is applied to a device such as a fan and a draught fan, a wind blowing direction of the device is in an extending direction from the stator end of the brushless motor towards the wiring board 3. Thus, in order to improve the heat dissipation efficiency of the brushless DC motor when using, a plane where the driving board 2 is located is arranged parallel to the extending direction from the stator end of the main body 1 towards the wiring board 3, so that the wind generated by the device can be used to cool the components at a surface of the driving board 2, so as to further improve the heat dissipation efficiency of the motor.

During assembly, referring to FIG. 2 and FIG. 3, in order to keep the plane where the driving board 2 is located parallel to the extending direction from the stator end of the main body 1 towards the wiring board 3, an extended mounting section 5 is integrally formed at a side of the driving board 2 towards the wiring board 3, and a bar shaped groove 6 configured for an insertion of the extended mounting section 5 penetrates through the wiring board 3. By inserting the extended mounting section 5 at the driving board 2 into the bar shaped groove 6, the driving board 2 can be fixed in the extending direction from the stator end of the main body 1 towards the wiring board 3.

Referring to FIG. 2 and FIG. 3, after the driving board 2 is fixed, it is necessary to ensure an electrical connection between the driving board 2 and the wiring board 3. Thus, a first conductive layer is provided at a side surface of the extended mounting section 5. Meanwhile, a second conductive layer 7 is provided at a position at an inner wall of the bar shaped groove 6 corresponding to the position of the first conductive layer. In the present application, the second conductive layer 7 is a conductive silver glue. After the extended mounting section 5 is inserted into the bar shaped groove 6 and the driving board 2 is fixed, the first conductive layer abuts against the second conductive layer 7, so that the driving board 2 is electrically connected with the wiring board 3.

In particular, a mounting hole 8 penetrates through the extended mounting section 5, and a conductive patch 9 is welded in the mounting hole 8. In the present application, the first conductive layer is formed by the conductive patch 9.

During the use of the brushless motor, it is necessary to ensure an electrical connection between the control board and the driving board 2. Thus, the surface of the driving board 2 is welded with an interface terminal 10 electrically connected with the driving board 2. When assembling, a row of wires at the control board can be plugged into the interface terminal 10, so as to ensure an overall electrical signal transmission in the brushless motor.

An implementation principle of the embodiments in present application of the integrated high speed brushless DC motor is as follows. During the practical use of the brushless motor provided in the present application, the driving components of the driver are integrated at the driving board 2, and the control components are integrated at the control board, and the plane where the driving board 2 is located is parallel to the extending direction from the stator end of the main body 1 towards the wiring board 3. Therefore, on one hand, the driving circuit can be preset at the driving board 2. Compared with conventional high speed brushless DC motor, there is no need to additionally provide the drive circuit to drive the motor. On the other hand, the driving components and the control components are detachably assembled, so that there is the low influence on the control components during the process of the driving components generating heat, and contact areas between all of the driving components and air are increased, so as to improve the heat dissipation efficiency of the driving components at the driving board 2; in addition, when the brushless DC motor is applied to the device such as the fan and the draught fan, the wind generated by the device can be used to cool the components at the driving board 2, and further improve the heat dissipation efficiency of the brushless motor.

Figure 4A:
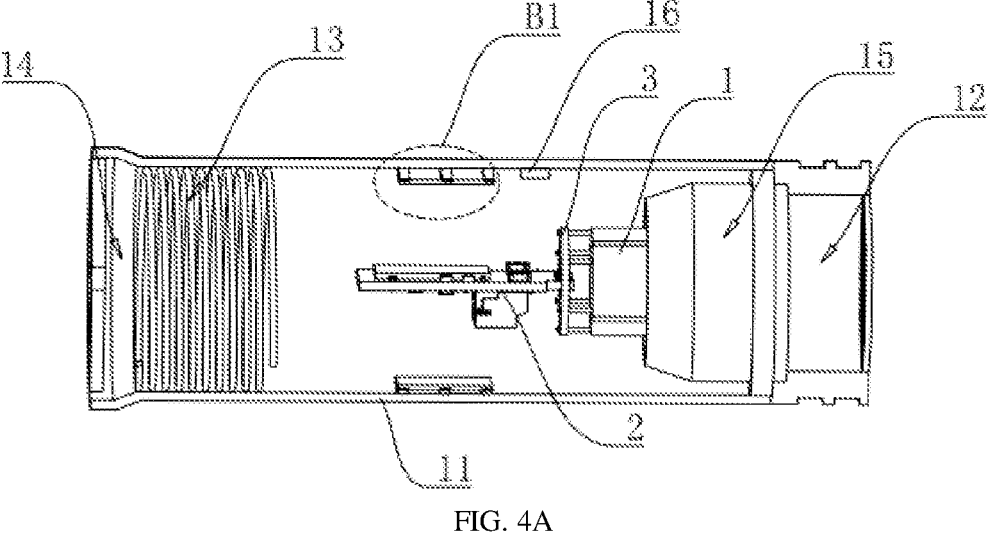
FIG. 4A shows the structure of a guide vane when a hair dryer in embodiments of the present application is not used or just put into use.
Figure 4B:
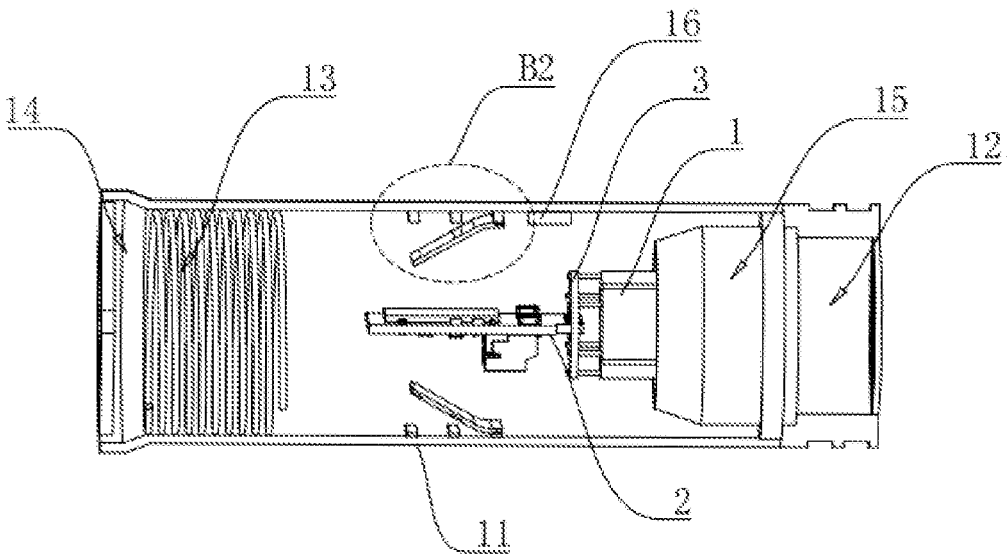
FIG. 4B shows the structure of the guide vane after the hair dryer in embodiments of the present application is used for a period of time.
Figure 5A:
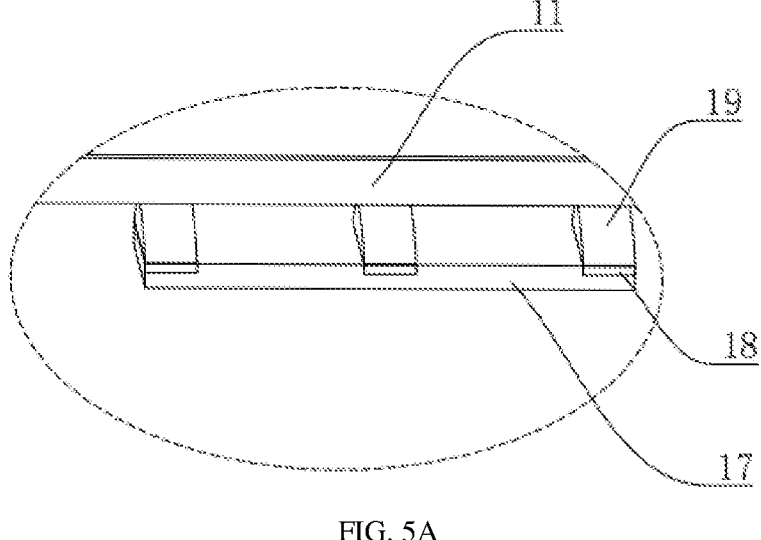
FIG. 5A is an enlarged view of Part B1 in FIG. 4A of the hair dryer in embodiments of the application.
Figure 5B:
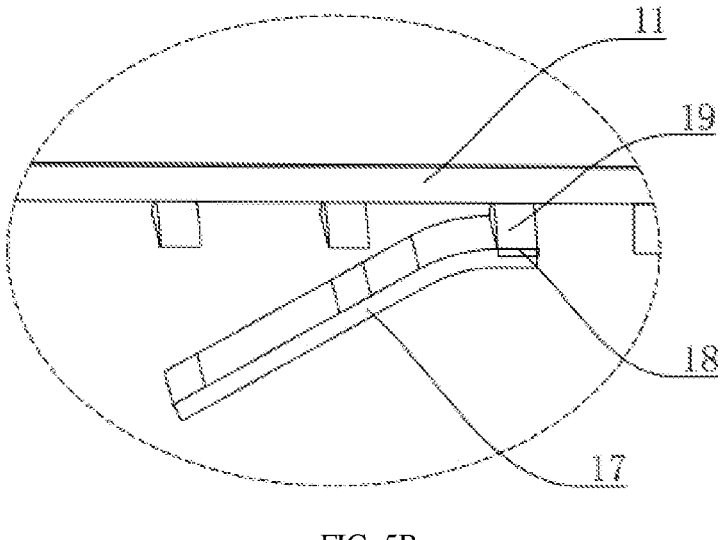
FIG. 5B is an enlarged view of Part B2 in FIG. 4B of the hair dryer in embodiments of the application.

Second, the hair dryer provided in the present application, referring to FIG. 4 and FIG. 5, includes a housing 11 and the brushless DC motor. The housing 11 includes an inlet section 12, a heat generation section 13 and an outlet section 14 provided successively. The motor is mounted between the heat generation section 13 and the inlet section 12, and the direction of the driving board 2 is the same as a direction from the motor towards the heat generation section 13. A fan assembly 15 is provided at a side of the motor towards the inlet section 12. In the embodiments of the present application, the fan assembly 15 includes fan blades (not shown in figures) mounted in the inlet section 12. When the fan blades rotate driven by the motor, the wind can blow from the inlet section 12 towards the outlet section 14. However, because a length direction of driving board 2 is consistent with a wind direction in the housing 11, the wind blowing from the fan assembly 15 towards the outlet section 14 can pass through the driving components at the driving board 2. Thus, the driving components at the driving board 2 can be cooled, so as to improve the heat dissipation efficiency of the driving components at the driving board 2.

Additionally, an inner wall of the housing 11 is mounted with a temperature sensor 16, which is mounted between the heat generation section 13 and the motor. During a use of the hair dryer, the driving components at the driving board 2 generate heat continuously, and the temperature rises continuously, thus in order to ensure that the temperature of the driving components at the driving board 2 will not be too high when it is detected that the temperature in the housing 11 continues to rise, a guiding assembly is mounted at the inner wall of the housing 11 and located between the heat generation section 13 and the motor, and is configured for guiding the wind in the housing 11 to the driving board 2. When it is detected that the temperature of an internal space of the housing 11 between the heat generation section 13 and the motor rises, the wind direction between the heat generation section 13 and the motor in the housing 11 can be adjusted by using the guiding assembly, so as to allow more wind to be guided to the driving components at the driving board 2, and ensure the heat dissipation efficiency of the driving components at the driving board 2.

In the embodiments of the present application, referring to FIG. 4 and FIG. 5, the guiding assembly includes guide vanes 17 obliquely provided at two inner walls of the housing 11 opposite to each other. There are two guide vanes 17, and the guide vanes 17 are mounted at the inner wall of the housing 11, which is parallel to a side surface of the driving board 2 where the driving components are integrated. When the wind in the housing 11 blows to the guide vane 17, because the guide vanes 17 is inclined, the wind blowing to the guide vanes 17 can be guided to the middle of the housing 11, so as to change the wind direction and allow more wind to blow to the driving board 2.

Referring to FIG. 4 and FIG. 5, in order to guide the wind blowing to the guide vanes 17 to the driving board 2 more smoothly, the guide vane 17 is of an arc shape, and a side of the guide vane 17 towards the driving board 2 is concave. Meanwhile, a side surface of the guide vane 17 away from the driving board 2 is provided with multiple magnetic blocks 18, which are arranged at intervals along a length direction of the guide vanes 17. In this embodiments, there are three magnetic blocks 18, which are metal blocks. Correspondingly, an electromagnet positions is provided at positions at the inner wall of the housing 11 corresponding to the position of the magnetic blocks 18, and a number of the electromagnets 19 is the same as that of the magnetic blocks 18.

During the use of the hair dryer, when the air dryer starts to be used, the electromagnet 19 farthest from the motor is powered on. At this time, the magnetic block 18 farthest from the motor are attached to this electromagnet 19, so that the guide vane 17 abuts against the inner wall of the housing 11. When it is detected that the temperature inside the housing 11 has risen to a certain value by using the temperature sensor 16, the electromagnet 19 farthest from the motor is powered off, and the middle electromagnet 19 is powered on. At this time, the electromagnet 19 farthest from the motor is separated from the magnetic block 18 farthest from the motor, and the middle magnetic block 18 is attached to the middle electromagnet 19, so that the guide vane 17 can bend towards the driving board 2, thus the wind blowing to the guide vane 17 can be guided to the driving board 2 to cool the driving components at the driving board 2. As the temperature continues to rise, only the electromagnet 19 closest to the motor is powered on. At this time, the middle electromagnet 19 is separated from the middle magnetic block 18, and the magnetic block 18 closest to the motor is attached to the electromagnet 19 closest to the motor. At this time, an included angle between the guide vane 17 and the inner wall of the housing 11 is further increased, so that more wind can be guided to driving board 2, so as to ensure the temperature of the driving components at the driving board 2 when the temperature rises. Finally, when the three electromagnets 19 are powered off, the included angle between the guide vane 17 and the inner wall of the housing 11 is largest, at this time, an amount of the wind that can be guided to the driving board 2 is maximum. Through the above process, when the temperature inside the housing 11 reaches different temperature thresholds, an inclination angle of the guide vane 17 can be adjusted, so as to realize an adjustment of the amount of the wind blowing to the driving board 2 and ensure the heat dissipation efficiency of the driving components at the driving board 2.

Figure 6A:
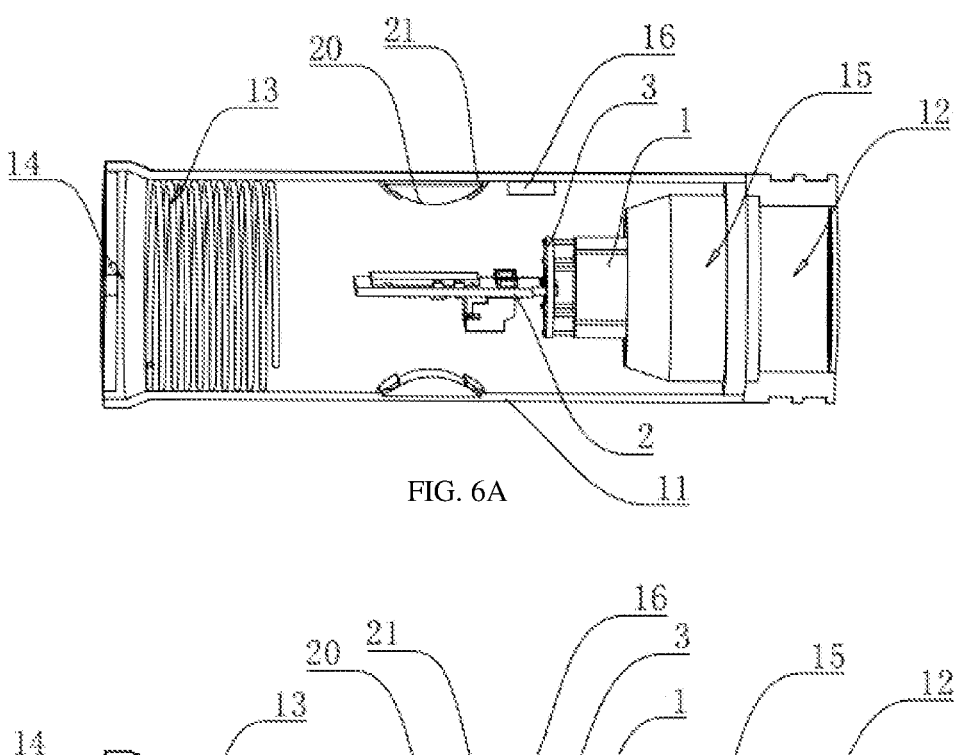
FIG. 6A shows the structure of an elastic layer when the hair dryer in embodiments of the present application is not used or just put into use.
Figure 6B:
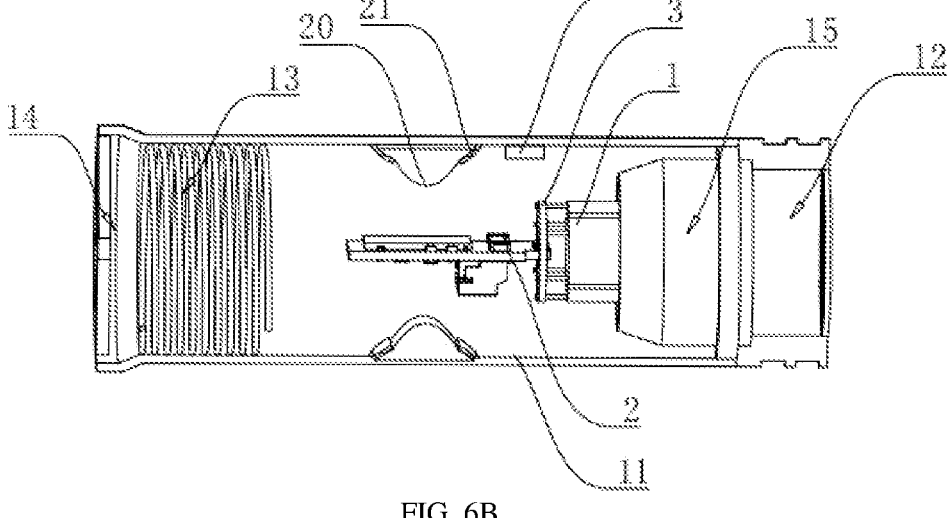
FIG. 6B shows the structure of the elastic layer after the hair dryer in embodiments of the present application is used for a period of time.

In other embodiments of the present application, referring to FIG. 6, the guiding assembly is mounted at an elastic layer 20 at the inner wall of the housing 11, which is parallel to the side surface of the driving board 2 where the driving components are integrated. An accommodation chamber is formed between the elastic layer 20 and the inner wall of the housing 11, and the accommodation chamber is filled with a preheated expanded vaporized liquid. In this embodiment, the vaporized liquid is perfluoro(2-methyl-3-pentanone) commonly used in fire protection.

Referring to FIG. 6, the temperature in the housing 11 rises, and the vaporized liquid in the accommodation chamber vaporizes slowly when heated, thus an atmospheric pressure in the accommodation chamber is greater than that in the housing 11, and then the elastic layer 20 protrudes towards the driving board 2. When the wind in the housing 11 blows towards the outlet section 14, because the wind is guided by the bulging elastic layer 20, the wind blows towards the driving board 2 in the housing 11, so as to increase the amount of the wind blowing to the driving board 2. In addition, in order to limit the protruding direction of the elastic layer 20 when the vaporized liquid is vaporized when heated, and to allow more wind to be guided to the driving board 2, the elastic layer 20 is of an arc shape protruding out of the inner wall of the housing 11. An arc limit plate 21 is provided at the inner wall of the housing 11 along an outer side of the elastic layer 20 and at both ends of elastic layer 20. When the vaporized liquid is vaporized when heated, the protruding direction of the elastic layer 20 can be limited by the arc limit plate 21, thus the elastic layer 20 protrudes more towards the driving board 2, so as to allow more wind to be guided to the driving board 2, and improve the heat dissipation efficiency of the driving components at the driving board 2.

An implementation principle of the embodiments in present application of the hair dryer is as follows. During the use of the hair dryer, the electric fan assembly 15 of the motor rotates in the housing 11. During a process of the wind blowing from the inlet section 12 towards the outlet section 14, the driving components at the driving board 2 is in a process of continuous generating heat. However, because the length direction of the driving board is the same as the wind direction in the housing 11, the wind blowing from the fan assembly 15 to the outlet section 14 can pass through the driving components at the driving board 2, so as to improve the heat dissipation efficiency of the driving components at the driving board 2. When it is detected that the temperature of the internal space between the heat generation section 13 and the motor in the housing 11 rises, the wind direction between the heat generation section 13 and the motor in the housing 11 can be adjusted by using the guiding assembly, so as to allow more wind to be guided to the driving components at the driving board 2, and ensure the heat dissipation efficiency of the driving components at the driving board 2.

The above are the preferred embodiments of the present application, and does not limit the protection scope of the present application. Therefore, any equivalent changes made according to the structure, shape and principle of the present application should fall within the protection scope of the present application.

REFERRING SIGNS 1 main body; 2 driving board; 3 wiring board; 4 through hole; 5 extended mounting section; 6 bar shaped groove; 7 second conductive layer; 8 mounting hole; 9 conductive patch; 10 interface terminal; 11 housing; 12 inlet section; 13 heat generation section; 14 outlet section; 15 fan assembly; 16 temperature sensor; 17 guide vane; 18 magnetic block; 19 electromagnet; 20 elastic layer; 21 arc limit plate.

What is claimed is:

1. A hair dryer, comprising a housing and a brushless direct current motor, wherein the brushless direct current motor comprises a main body and a driver, the driver comprises a driving board configured for integrating a plurality of driving components, a wiring board, and a control board configured for integrating a plurality of control components, the wiring board is provided at a stator end of the main body, the driving board is provided at a side of the wiring board away from the stator end of the main body, a plane where the driving board is located is parallel to an extending direction of the stator end of the main body towards the wiring board, the driving board is electrically connected with the wiring board and the control board respectively, the housing comprises an inlet section, a heat generation section and an outlet section, the brushless direct current motor is provided between the heat generation section and the inlet section, the driving board is located at a side of the brushless direct current motor towards the heat generation section, a fan assembly is provided at a side of the brushless direct current motor towards the inlet section, an inner wall of the housing is provided with a guiding assembly configured for guiding a wind in the housing to the driving board, the guiding assembly comprises an elastic layer provided at the inner wall of the housing, and an accommodation chamber is defined between the elastic layer and the inner wall of the housing and filled with a vaporized liquid.

2. The hair dryer according to claim 1, wherein the guiding assembly comprises guide vanes obliquely provided at two inner walls of the housing opposite to each other.

3. The hair dryer according to claim 2, wherein a side of each of the guide vanes away from the driving board is provided with multiple magnetic blocks, a plurality of electromagnets are provided at positions at the inner wall of the housing corresponding to positions of the multiple magnetic blocks, and the inner wall of the housing is provided with a temperature sensor.

4. The hair dryer according to claim 3, wherein each of the guide vanes is arc shaped, and a side of each of the guide vanes towards the driving board is concave.

5. The hair dryer according to claim 1, wherein the elastic layer is arc shaped and protrudes out of the inner wall of the housing, and an arc limit plate is provided at the inner wall of the housing along an outer side of the elastic layer and at both ends of elastic layer.

* * * * *